Patented Nov. 18, 1947

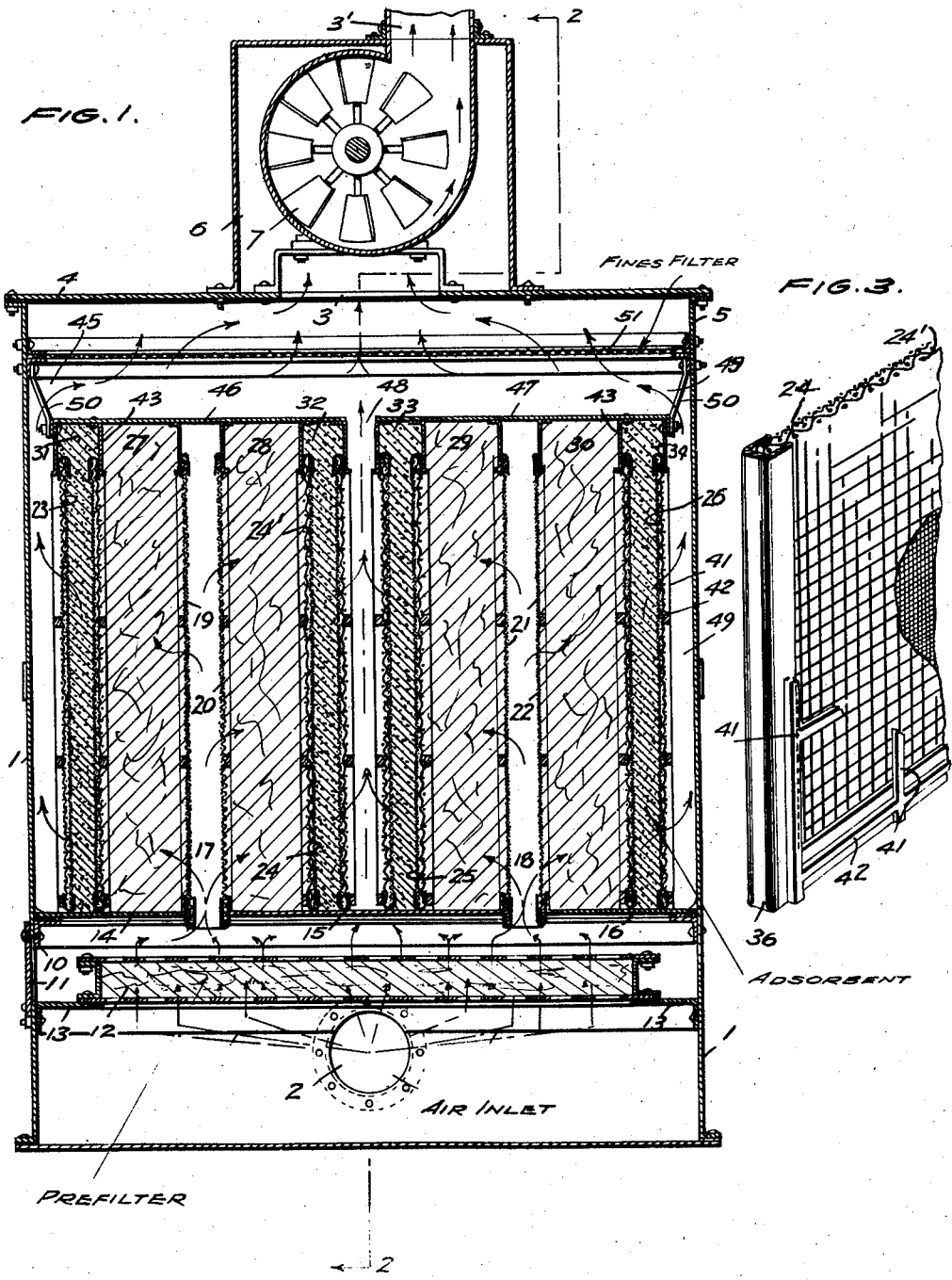

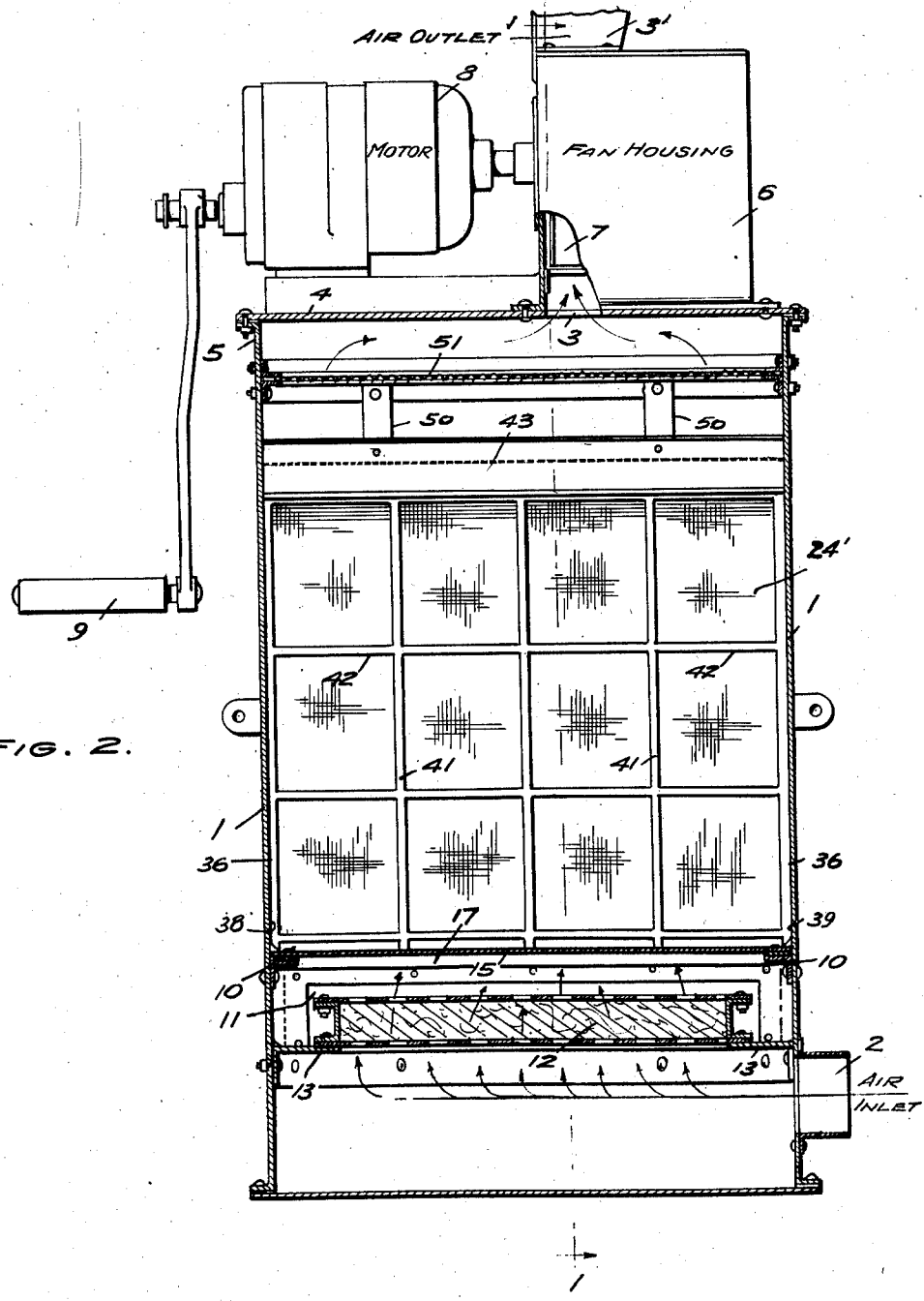

2,430,861

UNITED STATES PATENT OFFICE 2,430,861

GAS PURIFICATION METHOD

John H. Carpenter and Charles N. Griffiths, United States Army

Application February 24, 1944, Serial No. 523,662

1 Claim. (Cl. 23—4)

(Granted under the act of March 3, 1883, as amended April 30, 1928; 370 O. G. 757)

The invention described herein may be manufactured and used by or for the Government, for governmental purposes, without the payment to us of any royalty thereon.

This invention relates to an improved method and apparatus assembly adapted for the removal of dust particles, smoke particles, and gaseous contaminants from air or industrial gases, such as gaseous carbon dioxide. In a particular embodiment, the assembly comprises a simplified efficient apparatus, referred to as a collective protector, adapted for removal of noxious warfare gases from large volumes of air. It is a type of apparatus used for the protection of an inclosure in which it is inconvenient to wear gas masks and in which protection is to be provided over a long period for a group of several persons, such as in a command post workroom, an operating room, an air raid shelter or the like.

The removal of smokes and gases from contaminated air by small gas mask canisters is well known. Larger apparatus of the collective protector type has been designed and made for the purification of air supplied to inclosures to be occupied by several persons. However, the designed larger units, in general, have been relatively expensive to manufacture. They have been bulky, fragile, difficult to operate; they have required considerable machine work, and have not been adapted for assembly in mass production.

An object of this invention is to provide a simplified gas purification apparatus of rugged construction to withstand rough handling and capable of mass production.

Another object is to provide an air purification apparatus having an arrangement of means for drawing contaminated air by suction through a readily renewed prefilter into vertically extending passageways and transversely through vertically extended beds of filtering and adsorbent agents which provide a large free-surface contact area to save considerable space, reduce weight and facilitate the operation. These and further objects of the invention will be understood from the following description and accompanying drawings, and from the appended claims, in which various novel features of the invention are particularly set forth.

Figure 1 of the drawings diagrammatically illustrate a preferred embodiment of the apparatus in a vertical cross-sectional view along line 1—1 of Figure 2.

Figure 2 is a vertical cross-sectional view of the apparatus along line 2—2 of Figure 1.

Figure 3 is a detailed perspective view, partly in section, of retaining screens and frame for an adsorbent material chamber in the apparatus.

Referring to the drawings, the protector apparatus comprises a cubically-shaped metal housing 1, which may be termed a canister housing, having an inlet 2 for entrance of the contaminated air on a side near the bottom of the housing, and a purified air outlet 3 in the top of the housing, whence the purified air is expelled through discharge outlet 3' into the room or inclosure which is to be supplied with purified air. The top 4 of the housing may be removably attached to the sides 5, as by screwing or bolting, for permitting convenient access to the interior of the unit.

The top of the unit carries a fan housing 6 containing a fan or air-impelling means 7, the driving motor 8, and the crank 9. The crank 9 is in a normally disengaged manner, but so that the crank will engage and the unit be operable manually in the event of power failure to the motor, motor failure, or like difficulty. The construction and positioning of the crank assembly shown has been found by actual test to be conveniently operable without undue physical effort. The handle is at a suitable height and in a position which provides ample foot room.

It is advantageous to have the purified air outlet and fan at the top and to have the air drawn by suction through the unit, particularly in the instance of purifying air containing poisonous and corrosive gases. This arrangement lessens the danger of poison gas leakage into the space being supplied with purified air and reduces the possibility of corrosion of the fan and associated mechanism.

The canister housing 1 is provided near the bottom with a removable plate 11 for permitting easy access to the lower part of the unit, as for changing, adjusting or renewing the prefilter 12.

Referring now to the prefilter and various other parts within the canister housing, the construction and arrangement of these internal parts are important, not only for obtaining efficient removal of poisonous gas and smoke contaminants with a minimum danger of leakage, but also for obtaining a more simplified construction adapted to mass production at low cost. Also, the internal construction is preferably such that air flow resistance is reduced to a minimum in order to facilitate operation. It is believed that a low pressure drop through the unit of up to 1.8 inch to 2.0 inches of water, with the apparatus of the present invention, as compared to a pressure drop of 4.0 inches to 8.0 inches of water encountered with other units containing long cylindrical filters, air baffles, restricted passageways and the like, is a marked improvement.

Starting at the inlet 2, the first internal part met by the drawn-in contaminated air near the bottom of the unit is the prefilter 12. This prefilter may be a standard commercially obtainable part, such as is used in air conditioning, comprised of a perforated frame filled with glass wool coated with a liquid or resin liquid oily substance. The coating may be a non-volatile petroleum oil, and the oil may contain a viscosity and adhesion-increasing addition agent, such as isobutylene polymers. Also, by using other addition agents or other liquid substances in the prefilter, the coating is made to function not only for removal of dust particles but also for neutralizing or absorbing, in part at least, noxious vapors, particularly toxic organic vapors.

Some substances may be used with particular effectiveness in a wet or liquid state for neutralizing and absorbing poison gases, and such substances can be used as addition agents in a viscous liquid solution coating for the glass wool. For example, a substance known as hexamethylenetetramine readily neutralizes phosgene, particularly in an alkaline oily solution with phenol. Other liquid substances have been developed which are highly effective for neutralizing vesicant gases, such as mustard and lewisite. These substances also are particularly effective in an oily blend. Furthermore, by having such oily blends mixed with a thickening polymer, particularly polymers, such as polybutenes, which have high adhesion and stringiness, the resulting mixture can be used very satisfactorily as a coating for the glass wool to provide a large absorption contact surface which gives an action substantially equivalent to bubbling a gas with good distribution through a liquid.

The use of the prefilter is favorable for easily renewing the absorbent agent. The glass wool filters are easily removed; and the contaminated coating is easily washed off by a solvent, as, for example, a kerosene distillate, after which the glass wool can be recoated. By using one or more of the prefilters in the manner described for absorbing noxious vapors, the load on the remainder of the filtering and adsorbing materials in the apparatus is considerably reduced; and, accordingly, the quantities of these materials used can be diminished.

The prefilters may be held in the canister housing on suitable supports, such as angular members 13, extending around the entire periphery of the housing, and securely attached to the housing, as by spot welding or bolting. While tightness is desirable, the particular tightness and freedom from leaks required at certain other points is not required in the prefilter, when it serves preliminarily to remove dirt, dust and other large particles. The prefilter may be in various positions, such as inclined, horizontally or vertically across the path of the air stream.

Positioned above the prefilter are horizontally extending plates 14, 15 and 16, which may be attached to the internal canister housing walls, as by welding, or which may be snugly seated on an angular member 10, extending around the periphery of the housing. A plastic caulking compound may be used to insure a gas seal at the junction of the plates with the canister wall and the supporting member. It is important that there be no gas leakage at this place. In other words, the only path for the contaminated air, after passage through the prefilter, should be through the vertically extending inner passageways 17 and 18 formed by screens 19, 20, 21 and 22.

By spacing the passageways 17 and 18 between the center of the canister and the side walls, as shown, the passageways serve to supply transversely flowing broad streams of air to a plurality of vertically extending filters which provide a large, free-surface contact area. This arrangement serves to aid in the distribution of the air uniformly without the need of baffles or the like and greatly lowers the pressure drop.

The screens 19, 20, 21 and 22, together with the vertically extending finer-mesh screens 23, 24, 25 and 26 in the charcoal frames, form vertically extending inner compartments or chambers 27, 28, 29 and 30. These chambers so formed are filled, preferably, with a fibrous filter material which does not tend to pack, such as rock wool. To further insure prevention of leakage, parts of these chambers may be coated with a suitable adhesive, such as asphaltic material, and the fibrous material introduced with sufficient pressure and packing so that it adheres to the adhesive on the sides, and there are no thin spots or channels through which leakage can occur.

Excellent results have been obtained in using rock wool as the fibrous material in the filter chambers constructed in the manner described. By using this filter medium, the ruggedness of the apparatus is enhanced and the gas flow is uniform with a very low resistance, while there is a remarkably good elimination of extremely fine solid particles and liquid droplets from the air. In some instances, the filter may contain asbestos, particularly of a long fiber type; also, lumps or pellets of porous materials, such as bauxite.

The fibrous filters 27, 28, 29 and 30 are positioned adjacent the air passageways so that the contaminated air must pass therethrough and have any particles removed before reaching the chemical adsorption chambers or outer compartments 31, 32, 33 and 34 wherein any remaining gaseous contaminants are removed. The chemical adsorption chambers may be filled with one or more types of substances referred to as adsorbents and capable of removing gaseous contaminants by adsorption, absorption and/or chemical reaction. For example, suitable adsorbent materials for these operations are activated carbon, impregnated charcoal, soda-lime, various solid catalytic agents, and combinations of such materials.

The chemical adsorbent beds or outer compartments 31, 32, 33 and 34 are also positioned vertically, as shown, adjacent to the inner compartments containing the fibrous filters, 27, 28, 29, and 30, and arranged so that each inner compartment and its adjacent outer compartment forms a decontamination unit as shown in Fig. 1. The adsorbent filter frames are preferably of a special construction comprising a rectangular outer frame 36 which fits tightly against the canister housing. These frames may be secured to the housing by welding. The junction of the frame with the wall, as at 38 and 39, may be coated with a plastic caulking compound to further insure prevention of leakage. Also, if desired, the frames may be slid into grooves formed by metal strips welded to the housing and with gas-resistant gasketing material providing a gas-tight seal in the grooves.

The screen frames may be provided with cross members 41 and 42 for preventing deformation. It is very desirable to have the frames rigid, as any deformation might cause the charcoal or similar material to become packed in a way which gives rise to channeling or leakage. The fine wire screens 23, 24, 25 and 26, or at other places in the chemical adsorbent chambers, preferably should be of a fine mesh smaller than the adsorbent material; for example, a screen having about 225 holes of 0.033 inch diameter per square inch is satisfactory for commonly used charcoal adsorbent. As illustrated in Figure 3, each of the fine screens 24 may be reinforced by a larger mesh heavy wire screen 24'.

Another advantageous feature in the construction of the filter frames is the wide member 43 in the upper part of the frames. This member serves to prevent channeling or leaks, even should the charcoal or adsorbent filling become shaken down and packed during shipping and use.

The frames are disposed within the housing to provide exit passageways 45, 48 and 49 for the purified air.

Referring to Figure 1, the filter and chemical adsorption chambers are covered in a gas-tight manner by plates 46 and 47 which sit down as a cover on the frames and which have metal straps 50 for attachment by screwing or bolting to the housing 1 for securing the frames in position. For obtaining gas-tight joints not affected by poisonous gas, a suitable gasketing material may be made by impregnating paper about $\frac{1}{16}$ inch thick with a 145° F. melting point amorphous petroleum wax. Also, screw or bolt-heads and similar parts may be coated with the wax to insure prevention of leakage.

Above the cover plates 46 and 47 and in the space between these plates and the top of the canister may be placed a thin horizontally extending postfilter member 51 designed as a fines filter. This filter may comprise merely a sheet of filter paper or a fabric extending substantially across the entire unit so that the purified air will readily pass through but with sufficiently fine pores so that any small particles, such as charcoal particles, will not be carried out of the unit. This member may be held in place between screens similar to 19, and the screens may be attached to the canister walls in any convenient manner.

After the apparatus has been completely assembled, the filter and adsorbent chambers having been completely filled with filter medium and chemical adsorbent, accompanied by jarring to pack the adsorbent, the operation of the apparatus may be started by placing the fan in motion either by motor or manually.

The fan draws the contaminated air into the inlet tube through the prefilter 12 where dust particles are removed and where a substantial portion of gaseous contaminants may also be removed; thence through passageways 17 and 18 and transversely first through the fibrous filter medium and then through the adsorbent material. The purified air finally passes via exit passageways 45, 48 and 49 and through fines filter 51 which removes entrained solid particles.

The purified and cleaned air is drawn through outlet 3 into the fan housing 6 from which it is blown into the space to be provided with purified air.

After a period of service, the filtering and chemical adsorbent materials may be changed by virtue of a demountable construction of parts; but, for example, the glass wool filters can be replaced through plate 11 and access to the filter and adsorbent chambers for refilling may be had through the detachable top of the unit.

The units may be employed singly, or several in parallel may be employed when it is desired to handle larger volumes of air. In the latter instance, a single large-capacity fan may be employed in place of smaller fans on each unit. Also, the filter and adsorbent chambers can be made up into individual sets, like the set consisting of chambers 31, 27, 28 and 32; and one or several duplicate sets of this kind may be used in a unit.

Air purifying units embodying features of this invention may be used in industrial plants for purifying air in buildings and testing rooms where harmful dusts or noxious gases tend to contaminate the air. They may be utilized with great benefits in hospitals for removing objectionable odors, dusts and smoke particles.

The exemplary collective protector described with reference to the drawing has one of many possible arrangements and is not to be considered as limiting the applicability of the features of the invention. The relative positions of the parts and the construction of the collective protector unit were especially designed to meet specific requirements including simplicity, ruggedness, ease of maintenance and operation. For other purposes, the apparatus may have other arrangements without detracting from the performance of the invention features. For example, the gas inlet could be at the top of the housing and the outlet with motor and fan located at the bottom with minor changes in the internal construction.

Among salient features of the invention, an important one is the use of rock wool, a resilient fibrous material unaffected by moisture or organic vapors, particularly interposed between an oil-coated fibrous prefilter and a bed of granular adsorbent material, such as activated carbon. Rock wool serves uniquely to protect the adsorbent from aerosols and oil vapors, acts as a compact and resilient filter medium which can be adjusted to a desired gas flow resistance, and is not subject to displacement. The low pressure drop attainable in the collective protector as compared to other units is definitely an advantage; but in an apparatus intended for use in a restricted space with power consumption not a major factor, the rock wool could be compressed so as to occupy 10 to 25% less volume.

Although the principle and mode of operation of the invention have been illustrated and described with reference to the preferred embodiments, it is to be understood that various modifications come within the spirit and scope of the invention.

We claim:

The method, for maintaining a continuously decontaminated airstream in a room, that includes the following steps; drawing a contaminated airstream upwardly through a horizontal prefilter bed of mineral fibers coated with a viscous material containing a thickening polymer of the polybutene type, directing said airstream into a series of vertical air passages spaced at equal intervals in communication with said prefilter, drawing said airstream transversely through a series of vertical filter compartments adjoining said passages and containing filter material for removing moisture from said airstream, subsequently drawing said airstream transversely through vertical compartments adjoining said filter compartments and containing filter beds of adsorbent and decontaminating material, subsequently drawing said airstream through an adjacent horizontal fine pore postfilter, and finally directing said airstream into said room.

JOHN H. CARPENTER.
CHARLES N. GRIFFITHS.

REFERENCES CITED

The following references are of record in the file of this patent:

UNITED STATES PATENTS

| Number | Name | Date |
|---|---|---|
| 711,187 | Stone | Oct. 14, 1902 |
| 1,585,113 | Robert | May 18, 1926 |
| 1,971,131 | Cornetto | Aug. 21, 1934 |
| 2,055,774 | Ray | Sept. 29, 1936 |
| 2,083,132 | Williams | June 8, 1937 |
| 2,122,514 | Crocker | July 5, 1938 |
| 2,273,779 | Dickey et al. | Feb. 17, 1942 |
| 2,283,043 | Busch | May 12, 1942 |
| 2,303,334 | Dauphinee | Dec. 1, 1942 |
| 2,337,232 | Daly | Dec. 21, 1943 |

FOREIGN PATENTS

| Number | Country | Date |
|---|---|---|
| 516,268 | Great Britain | Dec. 28, 1939 |
| 804,146 | France | Oct. 16, 1936 |